United States Patent
Sumerak

(10) Patent No.: US 6,672,026 B2
(45) Date of Patent: Jan. 6, 2004

(54) PULTRUDED I-BAR WITH CLIP FITTINGS ENABLING AUTOMATED GRATING PANEL ASSEMBLY

(75) Inventor: Joseph E. Sumerak, Solon, OH (US)

(73) Assignee: Creative Pultrusions, Inc., Alum Bank, PA (US)

( * ) Notice: Subject to any disclaimer, the term of this patent is extended or adjusted under 35 U.S.C. 154(b) by 0 days.

(21) Appl. No.: 10/138,963

(22) Filed: May 3, 2002

(65) Prior Publication Data

US 2003/0205020 A1 Nov. 6, 2003

(51) Int. Cl.$^7$ .............. E04H 12/00; E04C 3/02; E04C 3/30
(52) U.S. Cl. .............. 52/690; 52/664; 52/729.1; 446/106; 446/111; 403/381
(58) Field of Search .............. 52/664, 660, 690, 52/456, 729.1, 256, 656.8, 169.12; 15/215, 238; 446/106, 111, 122; 403/252, 364, 353, 381

(56) References Cited

U.S. PATENT DOCUMENTS

| | | | | |
|---|---|---|---|---|
| 488,933 A | * | 12/1892 | Axell | ............ 52/300 |
| 852,665 A | | 5/1907 | Kellog | |
| 936,167 A | | 10/1909 | Rittler | |
| 960,197 A | | 5/1910 | Priddle | |
| 1,120,928 A | * | 12/1914 | Golding | ............ 52/740.7 |
| 1,297,478 A | | 3/1919 | Ketler | |
| 1,309,200 A | * | 7/1919 | Hollar | ............ 52/648.1 |
| 1,562,006 A | * | 11/1925 | Sichterman | ............ 446/106 |
| 1,863,817 A | * | 6/1932 | Wells | ............ 52/693 |
| 1,866,176 A | * | 7/1932 | Schmidt | ............ 248/165 |
| 2,040,557 A | * | 5/1936 | Leake | ............ 52/730.1 |
| 2,078,117 A | * | 4/1937 | Auryansen | ............ 52/780 |
| 2,302,586 A | | 11/1942 | Thelen | |
| 2,981,383 A | | 4/1961 | Dunn | |
| 3,989,399 A | * | 11/1976 | Slowbe | ............ 403/245 |
| 4,129,974 A | * | 12/1978 | Ojalvo | ............ 52/729.1 |
| 4,289,563 A | | 9/1981 | Wiechowski et al. | |
| 4,485,597 A | * | 12/1984 | Worrallo | ............ 52/479 |
| 4,760,680 A | | 8/1988 | Myers | |
| 4,761,930 A | * | 8/1988 | Tepera | ............ 52/669 |
| 4,800,698 A | | 1/1989 | Murphy | |
| 5,022,210 A | * | 6/1991 | Scott | ............ 52/733.2 |

(List continued on next page.)

FOREIGN PATENT DOCUMENTS

DE 3048152 A1 11/1980

Primary Examiner—Carl D. Friedman
Assistant Examiner—Nahid Amiri
(74) Attorney, Agent, or Firm—Thorp Reed & Armstrong LLP

(57) ABSTRACT

A structural system is comprised of two components. The first component is an I-shaped bearing member having an upper flange and a lower flange connected by a web. The upper and lower flanges have undercuts formed therein. The second component is a connection member having a notch in each corner for engaging the undercuts in the upper and lower flanges. The components of this system may be used to construct a structural component comprising a plurality of I-shaped bearing members positioned parallel to one another. A plurality of connection members interconnect the bearing members; the two upper notches of the connection member engage the undercuts in the upper flanges of two adjacent bearing members while the two lower notches engage the undercuts in the lower flanges of two adjacent bearing members. A method of constructing a structural component is comprised of positioning a plurality of bearing members parallel to one another. A plurality of connection members having cam surfaces are inserted between adjacent bearing members. Each connection member is rotated to first bring the cam surface into contact with the adjacent bearing members and then to lock the connection member in place.

23 Claims, 7 Drawing Sheets

U.S. PATENT DOCUMENTS

| | | |
|---|---|---|
| 5,133,523 A | 7/1992 | Daigle et al. |
| 5,215,490 A * | 6/1993 | Szoradi ...................... 446/115 |
| 5,251,857 A | 10/1993 | Grice et al. |
| 5,332,462 A | 7/1994 | Myers |
| 5,396,748 A * | 3/1995 | Rogers ........................ 52/664 |
| 5,411,356 A | 5/1995 | Travis et al. |
| 5,938,302 A | 8/1999 | Anderson et al. |
| 6,047,838 A | 4/2000 | Rindoks et al. |
| 6,237,299 B1 * | 5/2001 | Gortan ........................ 52/693 |
| 6,250,849 B1 * | 6/2001 | Marianski et al. .......... 405/273 |
| 6,272,796 B1 * | 8/2001 | Metzler ...................... 52/93.1 |

* cited by examiner

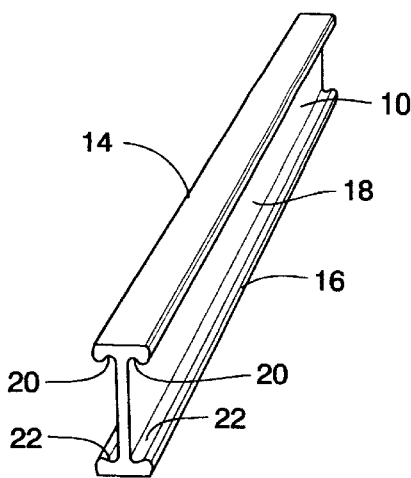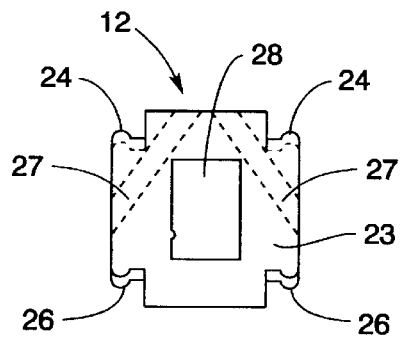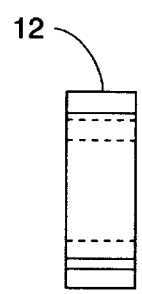
*Fig.1*  *Fig.2A*  *Fig.2B*
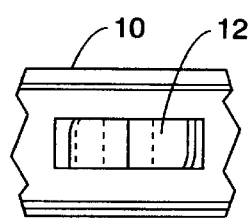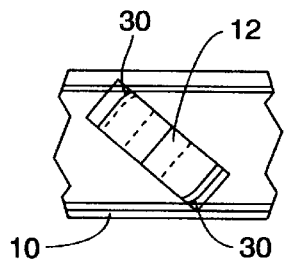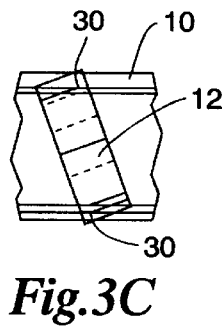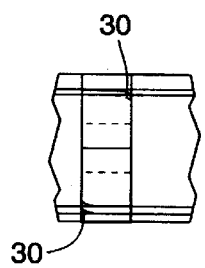
*Fig.3A*  *Fig.3B*  *Fig.3C*  *Fig.3D*
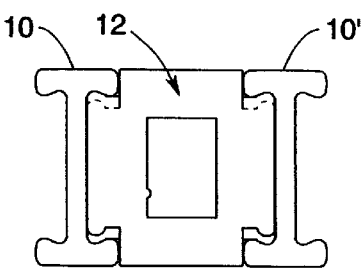
*Fig.4*

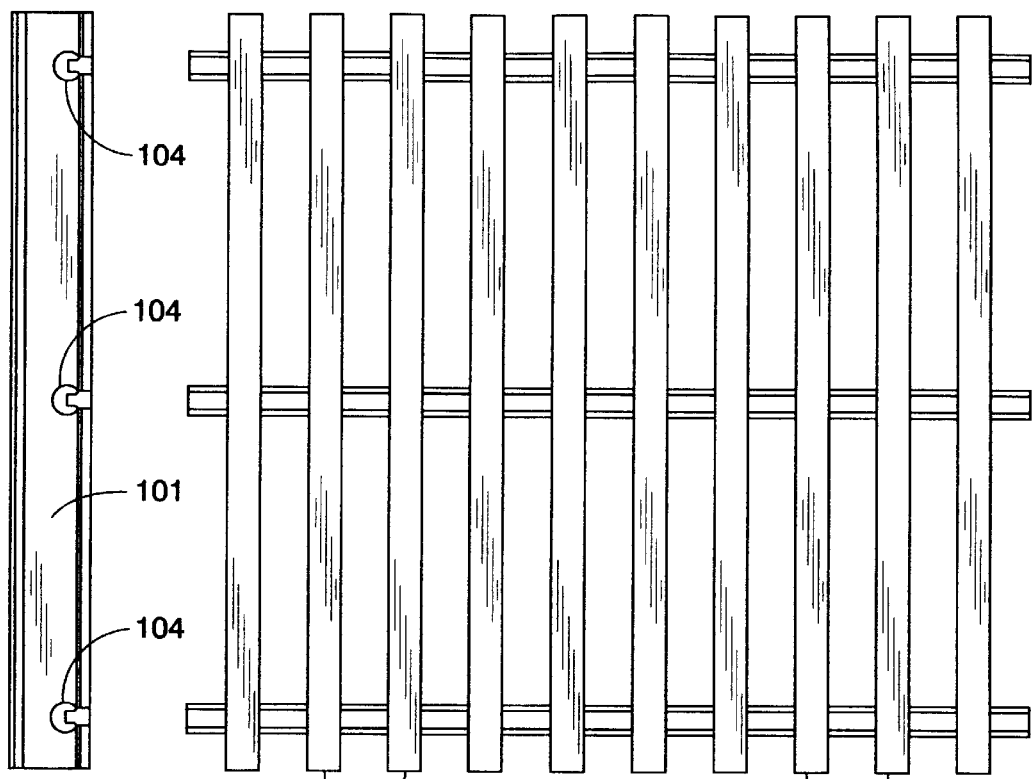
*Prior Art*
Fig.13C  Fig.13A
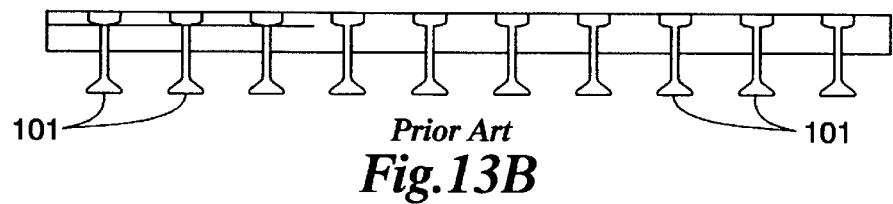
*Prior Art*
Fig.13B
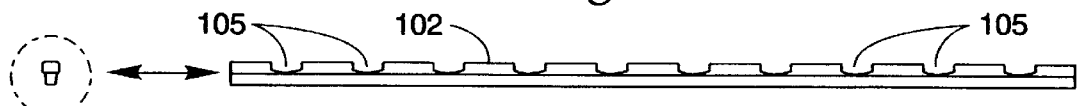
*Prior Art*
Fig.14
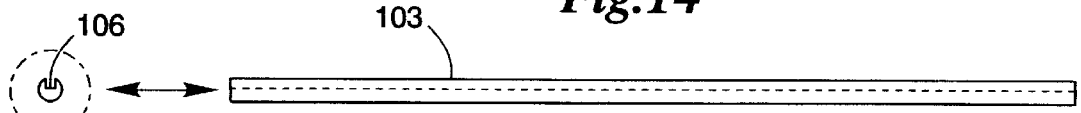
*Prior Art*
Fig.15

PULTRUDED I-BAR WITH CLIP FITTINGS ENABLING AUTOMATED GRATING PANEL ASSEMBLY

BACKGROUND OF THE INVENTION

Field of the Invention

The present invention is directed to structural systems comprised of reinforced resin members which are mechanically interlocked together. Such systems are often used to construct gratings used as a floor or walkway, but may be used to construct other structural components such as walls, stairs, shelving, and the like.

Description of the Background

FIGS. 13A, 13B and 13C are a top view, front view, and side view, respectively, of a three-part, prior art system that consists of a load bearing bar 101, a notched bar 102, (seen best in FIG. 14) and a locking groove rod 103, (seen best in FIG. 15). The three-part system requires pultrusion of three shapes, the load bearing bars 101, notched bars 102, and locking groove rods 103. Furthermore, after pultrusion, the bearing bars 101 must be fabricated to provide through holes (104 in FIG. 13C) and the notched bars 102 must be fabricated to provide notches (105 in FIG. 14) for spacing of the bearing bars 101. Once fabricated, the three-part system is assembled by inserting the notched bar 102 into parallel positioned bearing bars 101 through holes 104. Thereafter, the locking groove rod 103, having a groove 106 (best seen in FIG. 15) is inserted into holes 104 with the groove 106 receiving a base of the notched bar 102 to force the notched bar 102 into engagement with the load bearing bars 101. After the three-part system in FIG. 13A is assembled, it is placed on a slanted table and a low viscosity epoxy adhesive is applied around the intersection of the notched bars 102 and the bearing bars 101. That procedure is performed twice at two different angles to complete the assembly. When the assembly is used for flooring, a surface grit (not shown), which may consist of silica sand in a vinyl ester or epoxy resin, is applied to a top surface of the assembly. The assembly is allowed to cure for a period of several hours before the process is considered complete. The prior art procedure is labor intensive and requires multiple steps. It also presents significant lead-time from order to completion and delivery of the assembly. Furthermore, the prepositioning of holes 104 prohibits the repositioning of the notched bars 102 to those areas where additional strength may be needed. A significant issue with respect to the prior art designs that require drilling through the I-bar web is the reduction of mechanical strength which occurs when the fiber reinforcement is interrupted.

In one such design, the location of the holes 104 is near the upper surface of the completed assembly such that the notched bars 102 are flush with the top of the bearing bars 101. The geometry of those components places the bottom of the hole 104 very near the center of the load bearing bars 101, which is where the highest shear stress is located during flexural loading. The tendency to split along the centerline between fabricated holes requires the use of reinforced mats to increase cross-directional strength. In the case of extreme fire exposure tests, one failure mode is for the load bearing bars to fracture into segments equal to the length of the bearing bar between the holes 104. Elimination of the holes 104 would increase the load bearing capacity of the bearing bars 101 substantially while reducing or eliminating the need for expensive cross-directional reinforcement materials.

A two-component, fiberglass reinforced, molded resin grating is disclosed in U.S. Pat. No. 4,760,680. The grating is formed of first and second sets of mutually parallel, interlocking, fiberglass reinforced, molded resin bars with the sets extending transversely to one another. One set consists of bearing bars of rectangular cross-section including at longitudinally-spaced positions within an upper edge, an inverted U-shaped notch including oppositely-directed, downwardly and outwardly oblique slots terminating at their upper ends adjacent the upper edge of the bearing bars in upwardly and outwardly diverging oblique cam surfaces. The second set of bars consists of cross bars of inverted U-shaped cross section including a horizontal base portion and a pair of downwardly and outwardly diverging legs of a thickness equal to the width of the diverging slots and being respectively received in the slots. The legs of the cross bars at longitudinally spaced positions are provided with rectangular locking notches from the free ends upwardly of a width generally equal to the thickness of the bearing bars and of a height which is less than the vertical height of the cross bars. The cross bars are forced downwardly at the locking notches into the inverted U-shaped notches formed within the upper edge of the bearing bars with the cam surfaces deflecting the oblique legs of the cross bar to momentarily deform the legs to cause the portions of the legs at the locking notches to snap into the oblique slots of the inverted U-shaped notches within the bearing bars to mechanically interlock the first and second sets of bars together. In this two-piece system, both members have notches formed therein.

The need exists for a structural system comprised of interlocking mechanical components which does not require any notching or holes to be formed in the load-bearing component. Furthermore, the components must be designed to enable cost-effective fabrication. There should ideally be a minimal number of components and a simple method of assembling the components that can be automated.

SUMMARY OF THE PRESENT INVENTION

The present invention is directed to a structural system comprised of two components. The first component is an I-shaped bearing member having an upper flange and a lower flange connected by a web. The upper and lower flanges have undercuts formed therein. The second component is a connection member having a notch in each corner for engaging with the undercuts in the upper and lower flanges. The components of this system may be used to construct a structural component comprising a plurality of I-shaped bearing members positioned parallel to one another. A plurality of connection members interconnect the bearing members; the two upper notches of the connection member engage the undercuts in the upper flanges of two adjacent bearing members while the two lower notches engage the undercuts in the lower flanges of two adjacent bearing members.

The present invention is also directed to a method of constructing a structural component comprising positioning a plurality of bearing members parallel to one another. A plurality of connection members having cam surfaces are inserted between adjacent bearing members. Each connection member is rotated to first bring the cam surface into contact with the adjacent bearing members and then to lock the connection member in place.

The present invention provides several advantages over, for example, the three-part prior art system. The present invention eliminates the logistics of molding three pultrusion shapes and controlling associated inventory levels. A structural component, such as a floor grating, wall panel, shelf, etc., can be assembled with fewer fabrication steps. Because the connection members can be located where desired, new spacing patterns can be employed to optimize load distribution rather than the uniform pattern dictated by the three-part prior art system. When a structural component is assembled with the present invention, adjacent components can be easily connected with connection members, because each component has at its outside edge one side of a bearing bar. That facilitates field installation in which one structural component may be secured to another resulting in a functional, seamless system, such as a flooring system. Use of connection members with specialized features allows for other objects to be connected to, carried by, or embedded in the structural component. By creating a molded surface texture on the connection members, and by applying a surface grit in-line during pultrusion of the bearing bar, the potential exists to assemble a flooring product in a very cost-effective manner. Those, and other advantages and benefits, will be apparent from the Description of the Preferred Embodiments appearing herein below.

BRIEF DESCRIPTION OF THE DRAWINGS

For the present invention to be easily understood and readily practiced, the present invention will now be described, for purposes of illustration and not limitation, in conjunction with the following figures, wherein:

FIG. 1 is a perspective view of a bearing member constructed according to the present invention;

FIGS. 2A and 2B illustrate one type of connection member constructed according to the present invention;

FIGS. 3A–3D illustrate a connection member at four different positions during an assembly process;

FIG. 4 illustrates two adjacent bearing members of the type shown in FIG. 1 interconnected by a connection member of the type shown in FIG. 2;

FIG. 7A illustrates how two structural components of the type shown in FIG. 5 may be connected together while

FIG. 9A illustrates a structural component with connection members spaced to provide local support while

FIGS. 13A, 13B and 13C are a top view, front view, and side view, respectively, of a prior art system; and FIGS. 14 and 15 illustrate two of the components of the prior art system of FIG. 13A.

DESCRIPTION OF THE PREFERRED EMBODIMENTS

Figure 5:
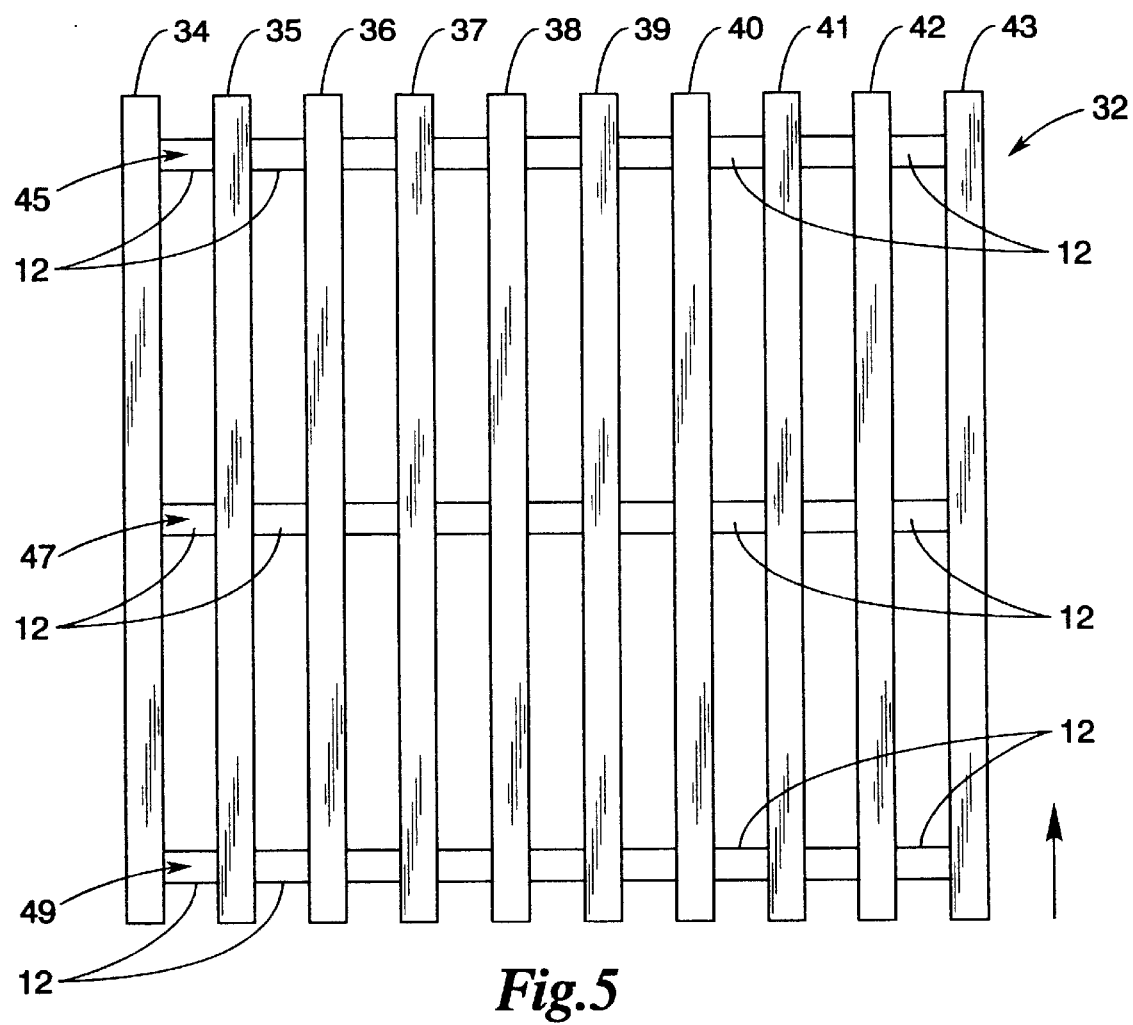
FIG. 5 illustrates a structural component comprised of a plurality of parallel spaced bearing members interconnected by a plurality of uniformly spaced connection members.

FIG. 1 is a perspective view of a bearing member 10 constructed according to the present invention. One example of the other component of the present invention, a connection member 12, is illustrated in FIGS. 2A and 2B. The bearing member 10 of FIG. 1 has a top flange 14 and a bottom flange 16 connected by a web 18. The top flange 14 has formed therein undercuts 20 while the bottom flange has formed therein undercuts 22. It is anticipated that the bearing member 10 will be a pultruded or an extruded member such that the profile illustrated in FIG. 1 can be produced by pultrusion, extrusion or other techniques without any further fabrication required.

The connection member 12 illustrated in FIGS. 2A and 2B is comprised of a main body 23 having a front and back through which an opening 28 extends, and four sides: top, bottom, right and left. The main body has two upper notches 24 at the two upper corners of the main body 23 and two lower notches 26 in the two lower corners of the main body 23. Each of the upper notches 24 and lower notches 26 may have a cam surface 30 (seen best in FIG. 3) associated therewith. It is anticipated that the connection members 12 will be comprised of a molded polymeric composition. However, other production techniques such as pultrusion, extrusion, stamping, etc. may be used for connection members 12. Furthermore, in certain embodiments it may not be necessary to provide cam surfaces 30 adjacent to both of the upper notches 24 and both of the lower notches 26. The embodiments shown in FIGS. 1, 2A and 2B are for illustration only and are not intended to limit the present invention.

In FIGS. 3A–3D a connection member 12 is illustrated at four different positions with respect to a bearing member 10 during an assembly process. During an assembly process, a plurality of bearing members 10 are positioned parallel to one another. A plurality of connection members 12, one of which is illustrated in FIGS. 3A–3D, is inserted between adjacent bearing members 10, only one of which is illustrated in FIGS. 3A–3D. The connection member 12 may be inserted to the desired position between adjacent bearing members 10 by using, for example, an L-shaped tool having the short end of the L extending through hole 28.

When the connection member has reached the desired position, see FIG. 3A, the connection member 12 is rotated, see FIG. 3B, by rotating the L-shaped tool, to bring the cam surfaces 30 into contact with the bearing member 10. Further rotation, see FIG. 3C, causes slight compression of the connection member 12 and, depending upon the material of construction, slight expansion of the bearing member 10, to enable notches 24 to engage undercuts 20 and notches 26 to engage undercuts 22. After rotation of the connection member into the vertical position illustrated in FIG. 3D, the connection member 12 is locked in place. Because there is a cam surface 30 only on one side of each notch, over-rotation of the connection member 12 is precluded. FIG. 4 illustrates two bearing members 10, 10' connected by connection member 12.

Figure 6:
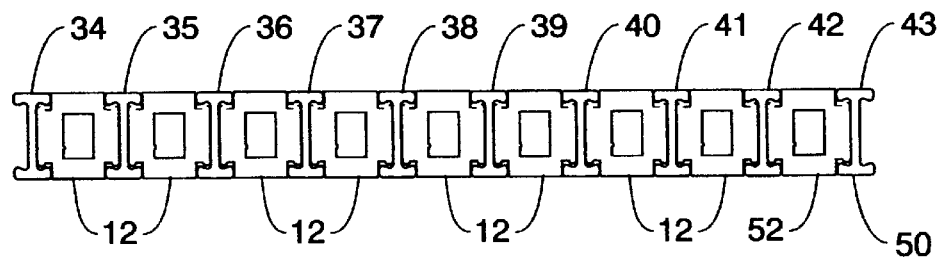
FIG. 6 is an end view of the structural component of FIG. 5 taken in the direction of the arrow shown in FIG. 5.

The process described in conjunction with FIG. 3 may be repeated as required to prepare a fully assembled structural component 32 of the type illustrated in FIG. 5. The structural component 32 is comprised of a plurality of bearing members 34–43, inclusive, interconnected by a plurality of connection members 12 as discussed hereinabove with FIG. 3. Those of ordinary skill in the art will recognize that the process of constructing the structural component 32 may be automated. For example, bearing members 34 through 43 may be held in a jig while a series of arms inserts and rotates a first row 45 of connection members 12. After the first row 45 of connection members is locked in place, the arms may then insert a second row 47 of connection members 12 and a third row 49 of connection members 12 to arrive at the configuration illustrated in FIG. 5. FIG. 6 illustrates an end-view of the structural member 32 of FIG. 5 taken in the direction of the arrow in FIG. 5. As can be seen in FIG. 6, each of the upper flanges of the bearing members 34 through 43 has a top surface 50. A top surface 52 of each of the connection members 12 is flush with the top surface 50. Once in place, connection members 12, which are mechanically locked, may also be adhesively bonded or the adhesive can be pre-applied before the connection members are rotated into the locked position. The adhesive may be applied on the surfaces of the connection member that contact the adjacent bearing members. In one embodiment, the adhesive is applied to the right and left sides of connection members 12. In another embodiment, adhesive may be injected and distributed in integrally molded channels 27 (shown in FIG. 2A) having an outlet located on a side in contact with bearing members 10.

Figure 7A:
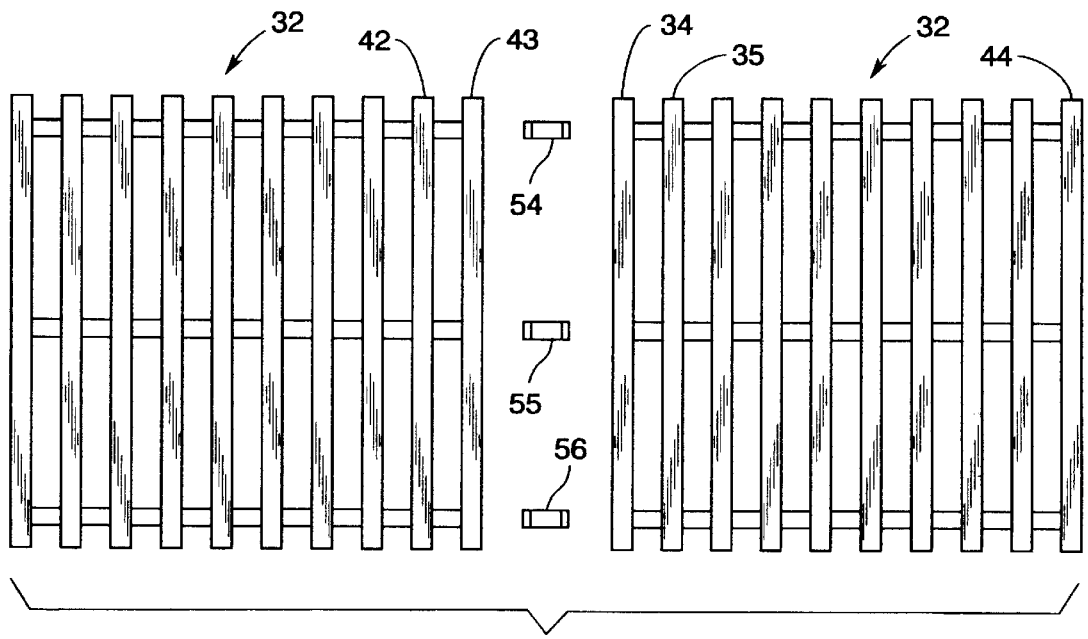
Figure 7B:
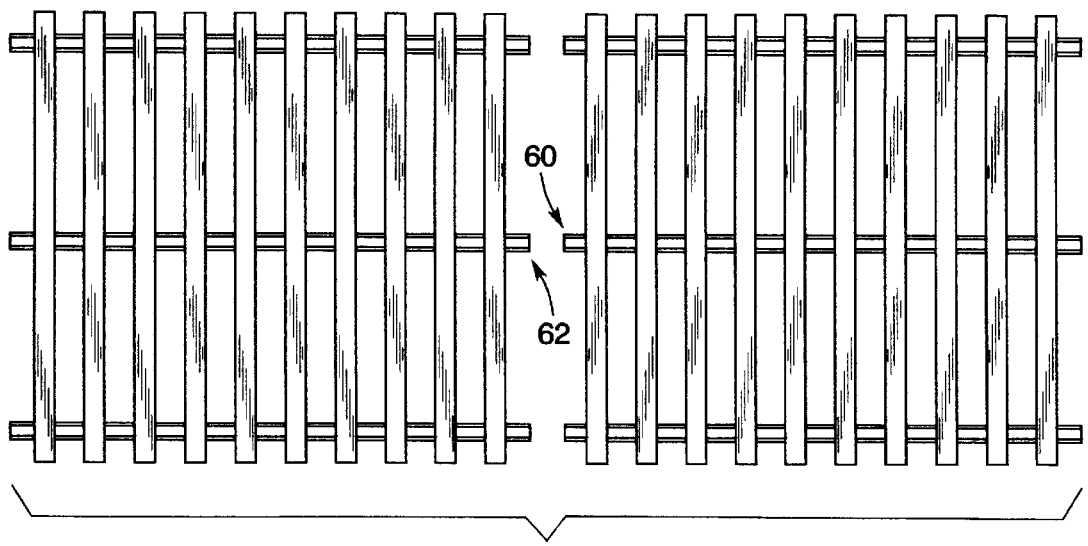
FIG. 7B illustrates two prior art structural components.

One advantage of the present invention is illustrated in FIGS. 7A and 7B. FIG. 7A illustrates two structural components 32 of the type illustrated in FIG. 5. The structural component 32 shown in the left side of FIG. 7A has a bearing member 43 which has only one adjacent bearing member 42. Similarly, the structural component 32 illustrated in the right-hand side of FIG. 7A has a bearing member 34 having only one adjacent bearing member 35. As a result, bearing members 43 and 34 can be connected with connection members 54, 55, 56 such that the two structural components 32 form a combination or unified component. Structural components 32 can be delivered to the field and assembled in the field using connection members 54, 55, 56. That is to be contrasted with the situation illustrated in FIG. 7B in which the prior art three-part system has exposed ends 60, 62 which do not facilitate field fabrication of a unified component as shown in FIG. 7A.

An additional benefit of the structural component 32 of the present invention is that the end bearing bar, e.g. bearing bar 44, may receive and retain a color coded strip or text sign between its upper and lower flange on the exposed outside edge. That is particularly useful in certain situations, such as where the structural component 32 is used as a stair, step, or platform edge.

Figure 8:
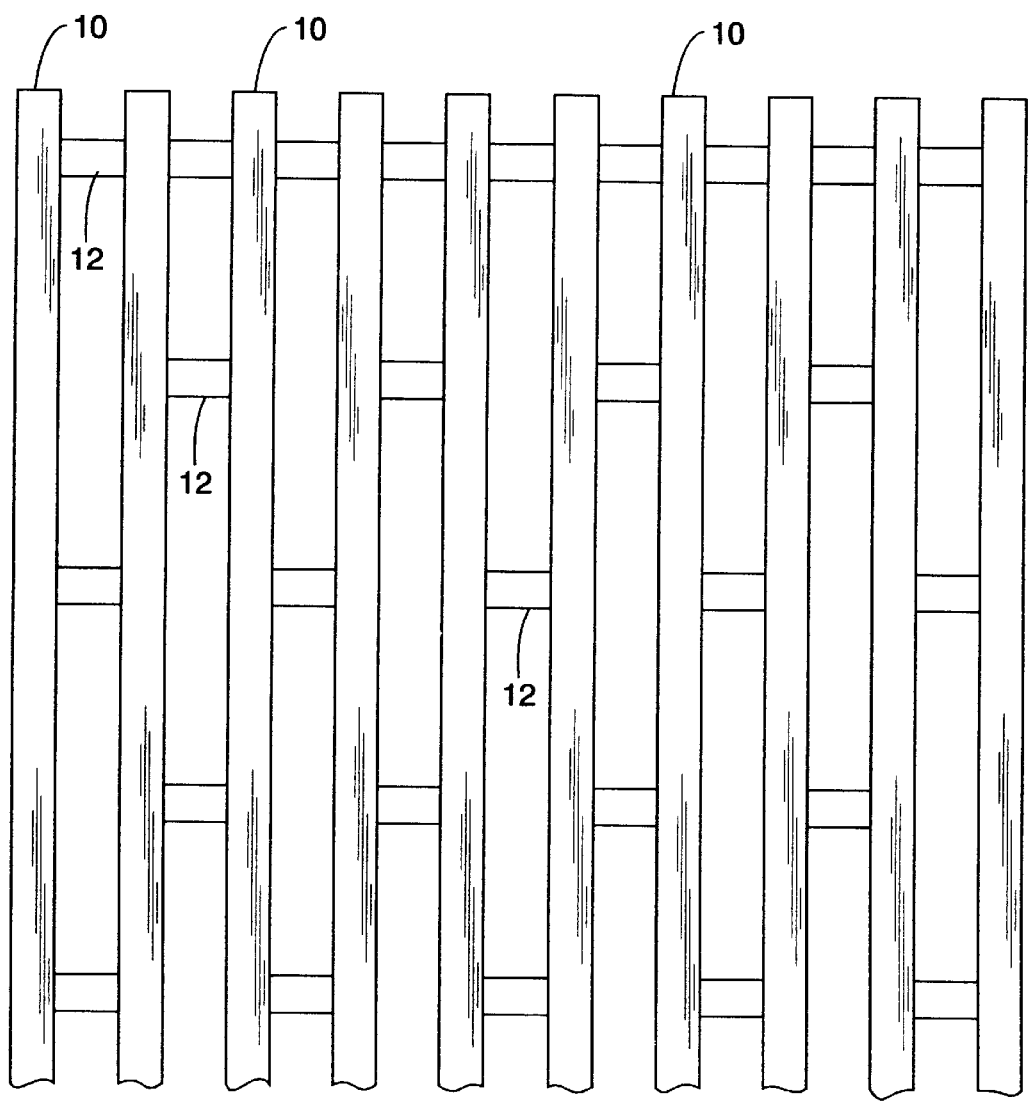
FIG. 8 illustrates a section of a structural component comprised of a plurality of parallel spaced bearing members interconnected by a plurality of non-uniformly spaced connection members.

The positioning of the connection members within structural components 32 in FIG. 7A is uniform. However, because each of the connection members can be individually positioned, a non-uniform positioning of the connection members can be achieved as illustrated in FIG. 8 to obtain optimized structural properties.

Figure 9A:
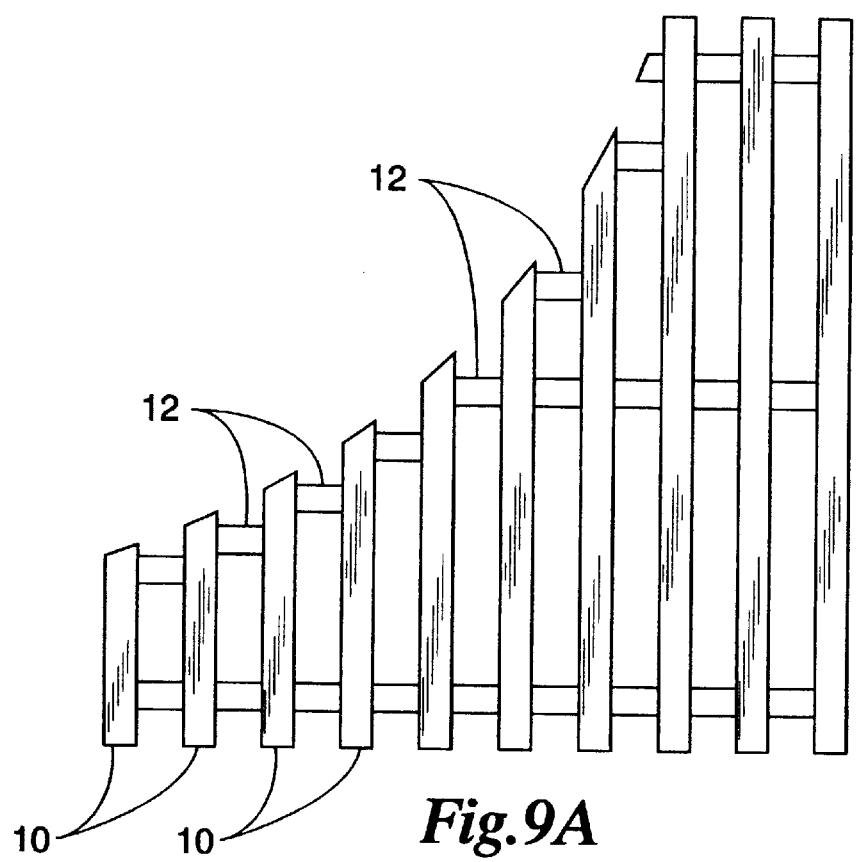
Figure 9B:
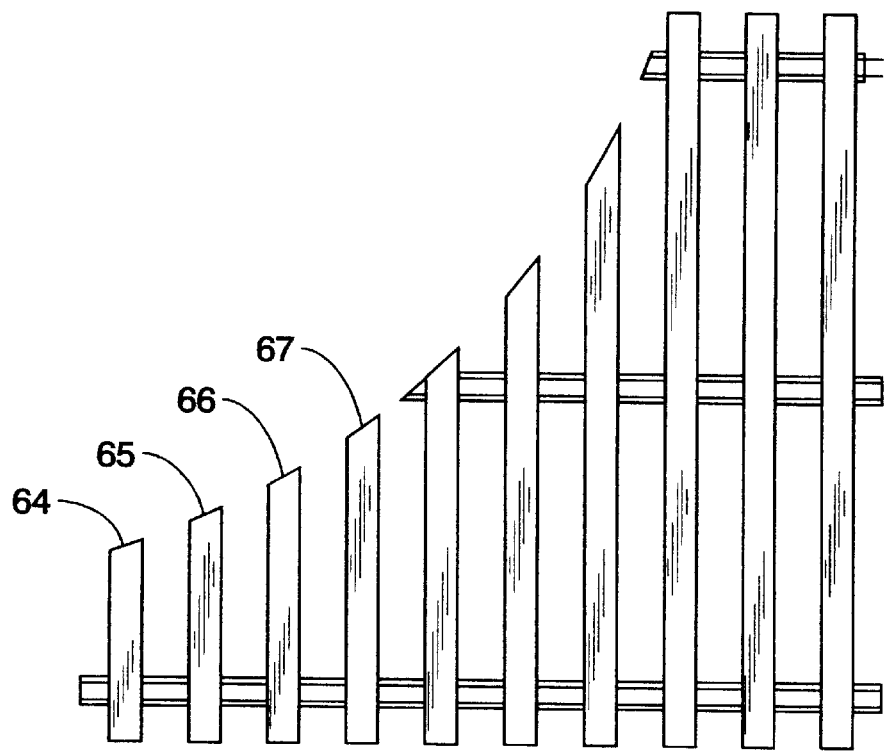
FIG. 9B illustrates the result of forming an opening in a prior art structural component.

The independent positioning of connection members 12 enables positioning of connection members 12 so as to provide local support around fabricated areas. For example, in FIG. 9A, a portion of an opening is illustrated in the upper left-hand corner. As seen in FIG. 9A, connection members 12 can be located so as to provide local support for the bearing members 10. That is to be contrasted with FIG. 9B in which an opening in the upper left-hand corner of a structural member is created in a prior art three-part system. As a result of the need to preposition the horizontal members in FIG. 9B, no local support is provided for the load-bearing bars such as bars 64, 65, 66, 67.

Figure 10:
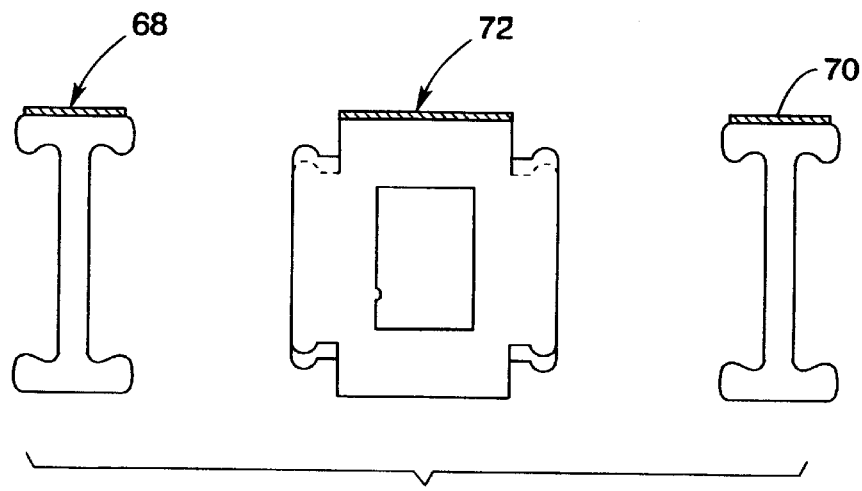
FIG. 10 illustrates two pultruded bearing members having a grit applied to a top surface thereof and a molded connection member having a texture molded into the top surface.

It is anticipated that the present invention may be used to produce structural components such as gratings used for flooring. FIG. 10 illustrates two pultruded bearing members 68, 70 and a molded connection member 72. Although the bearing members 68, 70 are identified as being pultruded and the connection member 72 as being molded, other methods of production may be utilized. The pultrusion process used to produce bearing members 68, 70 may have an in-line grit application phase to provide the top surface of members 68, 70 with a non-slip surface. In the case of extruded thermoplastic or metallic bearing members, surface knurling or impressing may provide that function. Similarly, a texture may be molded into the top surface of the connection member 72 such that the prior art process of applying and curing a surface grit in a secondary process may be eliminated.

Figure 11:
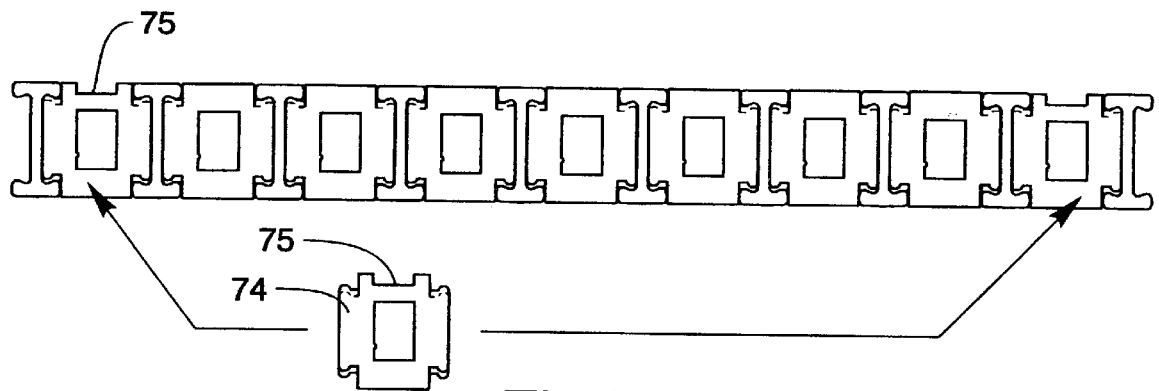
FIGS. 11 and 12 illustrate a plurality of bearing members interconnected by connection members of various configurations.
Figure 12:
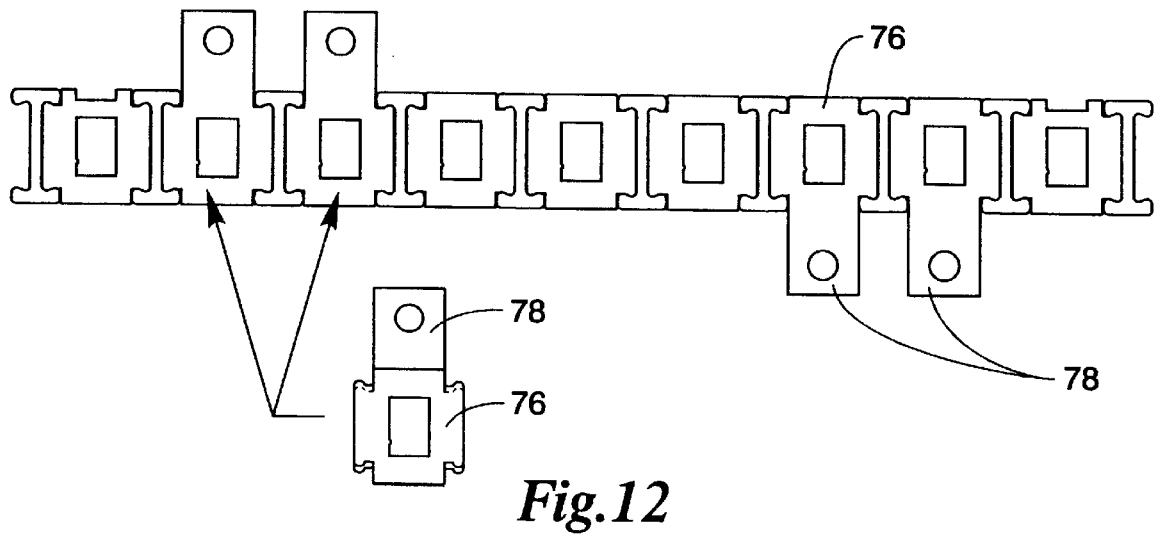

In some circumstances it may be desirable to provide connection members having recesses, see connection member 74 in FIG. 11, or projections, see connection member 76 in FIG. 12. The connection member 74 has a recess 75 formed therein as shown in FIG. 11 to enable, for example, a wire, hold-down clamp, or the like to be inlaid into the component and still have a smooth surface. The recess 75 can assume other shapes. FIG. 12 illustrates a connection member 76 having a projection 78, having integral through or threaded holes, which may be used, for example, for mounting purposes. Connection members 76 could be positioned, for example, along an edge of a floor panel grating so that a hand rail post can be connected to projection 78. Other types of projections 78 can be provided to enable structural components constructed according to the present invention to be used as wall components, floors, stairs, shelves, or other types of structural components. Additionally, connection members 76 of the type illustrated in FIG. 12 could be inserted so that the projection 78 extends below the structural member so that conduit, pipes, wires, etc. may be run under, for example, a grating or floor.

By changing the shape of the load bearing bars 101 of the prior art to produce the bearing members 10 of the present invention having the undercuts 20 and 22, a connection member 12 can be used to secure the bearing members 10 one to another without the need for fabricating holes in the bearing members. That improvement eliminates the shear strength reduction found in the three-part prior art system and allows the full section of the bearing members 10 to bear a load until a tensile or compressive failure occurs. The present invention requires only two types of components—the bearing member 10 and connection member 12. The connection member 12 geometry is such that it engages the undercut areas of the flanges to securely lock the bearing members into position. Although examples of bearing members and connection members 12 are illustrated, the geometry can be optimized for strength and function for a given application. When used, for example, in a flooring application, the top surface of the connection member is flush with the top surface of the bearing member. Additionally, because the connection member 12 is adjacent along its entire height to the bearing member 10, stability is improved. Once in place, a connection member may be adhesively bonded to secure its position or the adhesive can be pre-applied at the time of positioning of the connection member.

The connection member 12 is preferably of a low cost, polymeric composition. Its function is primarily as a positioning/locking spacer and not a load bearing member, so the need for fiberglass reinforcement for the connection members may not be necessary although glass reinforced polymer will provide additional dimensional stability. The connection member 12 is designed such that it can be compression or injected molded to reduce the cost per piece. The thickness and geometry can be optimized for function and cost. As previously stated, a contact side can be molded with texture. When the structural component is to be of a particular composition, e.g. polyester, vinyl ester, epoxy, phenolic, or polyurethane the connection member may be molded of a similar composition or designed to provide a minimum level of performance to meet or exceed the specifications for the structural component. It is also envisioned that stamped metallic connection members may be suitable or desirable in some applications.

In some environments, it may be desirable to pot the undercuts 22 in the bottom flange 16 with resin to reestablish a fluid shed surface.

The present invention provides numerous advantages such as the elimination of the logistics of molding three pultruded shapes and controlling associated inventory levels. Structural component assembly is faster with no fabrication steps and fewer assembly steps. New spacing patterns can be achieved by alternating connection member location rather than a uniform pattern dictated by the current three-part prior art system. The present invention eliminates from the edge of a structural component the protruding sections of the groove rod/notched bar which allows for more exact placement of structural components not subject to fabrication tolerances. Field installation of the connection members may be employed to secure one structural component to another resulting in a functional, seamless system. Use of connection members in specific locations can achieve local reinforcement around fabricated areas such as manhole openings, etc. Use of special connection members with recesses or projections enables the connection of other objects to the surface of the structural component. By creating an as-molded surface texture on the connection member and pultruding a single bearing bar and applying a surface grit in-line, the potential exists to assemble a grating product in a very cost-effective manner.

While the present invention has been described in connection with preferred embodiments thereof, those of ordinary skill in the art will recognize that many modifications and variations can be achieved. For example, connection members may have projections or recesses formed for holding specific items such as wires, conduits, or the like. Additionally, connection members having various projections may be formed to enable structural components to be connected together, connected to other structural components, and the like. The bearing member and connection member need not be strictly limited to the precise forms disclosed herein. The present invention may be used in other environments such as creating shelving systems, fabrication of walls, and other applications where modular types of construction are useful. Accordingly, the present invention is intended to be limited only by the following claims.

What is claimed is:

1. A structural system, comprising:
   a plurality of substantially I-shaped bearing members having an upper flange and a lower flange connected by a web, said upper and lower flanges having undercuts formed therein; and
   a plurality of connection members each having a plurality of notches, said notches sized for engaging said undercuts in said upper and lower flanges, at least certain of said notches having a cam surface adjacent thereto.

2. The structural system of claim 1 wherein said upper flange of said I-shaped members has an upper surface defining a top surface, and wherein each of said plurality of connection members has an upper surface which, when said connection member is connected between two adjacent I-shaped members, is flush with said top surface of at least one of said two adjacent I-shaped members.

3. The structural system of claim 2 wherein certain of said plurality of connection members have a recess formed in a side thereof.

4. The structural system of claim 1 wherein certain of said plurality of connection members have a projection extending from a side thereof.

5. A structural component constructed of reinforced resin members, comprising:
   a plurality of I-shaped bearing members positioned parallel to one another, each bearing member having an upper flange and a lower flange connected by a web, said upper and lower flanges having undercuts formed therein; and
   a plurality of connection members each having two upper notches at upper corners thereof and two lower notches at lower corners thereof, at least certain of said upper notches and said lower notches having a cam surface adjacent thereto, said two upper notches engaging said undercuts in said upper flanges of two adjacent bearing members, said two lower notches engaging said undercuts in said lower flanges of two adjacent bearing members.

6. The structural component of claim 5 wherein said upper flange of said I-shaped members has an upper surface defining a top surface, and wherein each of said plurality of connection members has an upper surface which, when said connection member is connected between two adjacent I-shaped members, is flush with said top surface of at least one of said two adjacent I-shaped members.

7. The structural component of claim 6 wherein certain of said plurality of connection members have a recess formed in a side thereof.

8. The structural component of claim 6 wherein said structural component is a floor grating and said upper surface of said bearing members has a grit applied thereto.

9. The structural component of claim 5 wherein said bearing members are pultruded and said connection members are one of molded, pultruded, extruded or stamped.

10. The structural component of claim 5 wherein certain of said connection members are positioned to provide local support around fabricated areas.

11. The structural component of claim 5 additionally comprising an adhesive applied to said connection members at least on certain of the surfaces contacting said bearing members.

12. The structural component of claim 5 wherein certain of said plurality of connection members have a projection extending from a side thereof.

13. A combination, comprising:
   a first structural component comprising:
      a first plurality of I-shaped bearing members positioned parallel to one another, each bearing member having an upper flange and a lower flange connected by a web, said upper and lower flanges having undercuts formed therein;
      a first plurality of connection members each having two upper notches at upper corners thereof and two lower notches at lower corners thereof, at least certain of said upper notches and said lower notches having a cam surface adjacent thereto, said two upper notches engaging said undercuts in said upper flanges of two adjacent bearing members, said two lower notches engaging said undercuts in said lower flanges of two adjacent bearing members, said first structural component having two outer bearing members which have only one adjacent bearing member; a second structural component comprising:

a second plurality of I-shaped bearing members positioned parallel to one another, each bearing member having an upper flange and a lower flange connected by a web, said upper and lower flanges having undercuts formed therein;

a second plurality of connection members each having two upper notches at upper corners thereof and two lower notches at lower corners thereof, at least certain of said upper notches and said lower notches having a cam surface adjacent thereto, said two upper notches engaging said undercuts in said upper flanges of two adjacent bearing members, said two lower notches engaging said undercuts in said lower flanges of two adjacent bearing members, said second structural component having two outer bearing members which have only one adjacent bearing member; and a third plurality of connection members each having two upper notches at upper corners thereof and two lower notches at lower corners thereof, at least certain of said upper notches and said lower notches having a cam surface adjacent thereto, said two upper notches engaging said undercuts in said upper flanges of one of said outer bearing members from said first structural component and one of said outer bearing members from said second structural component, said two lower notches engaging said undercuts in said lower flanges in said one of said outer bearing members from said first structural component and said one of said outer bearing members from said second structural component.

14. The combination of claim 13 wherein said upper flanges of said first and second pluralities of I-shaped members have an upper surface defining a top surface, and wherein each of said first, second and third pluralities of connection members has an upper surface which, when said connection member is connected between two adjacent I-shaped members, is flush with said top surface of at least one of said two adjacent I-shaped members.

15. The combination of claim 14 wherein certain of said plurality of connection members have a recess formed in a side thereof.

16. The combination of claim 14 wherein said combination is a floor grating and said upper surface of said bearing members has a grit applied thereto.

17. The combination of claim 13 wherein certain of said first and second pluralities of connection members are positioned to provide local support around fabricated areas.

18. The combination of claim 13 additionally comprising an adhesive applied to said connection members at least on certain of the surfaces contacting said bearing members.

19. The combination of claim 13 wherein certain of said plurality of connection members have a projection extending from a side thereof.

20. A method of constructing a structural component, comprising:

positioning a plurality of bearing members parallel to one another;

inserting a plurality of connection members having cam surfaces between adjacent bearing members; and rotating each connection member to first bring the cam surface into contact with said adjacent bearing members and then to lock said connection member in place.

21. The method of claim 20 additionally comprising applying an adhesive to said connection members at least on certain of the surfaces contacting said bearing members.

22. The method of claim 20 wherein said connection members are uniformly positioned.

23. The method of claim 20 wherein said connection members are positioned to provide local support.

* * * * *